(12) United States Patent
Gallagher et al.

(10) Patent No.: US 10,519,971 B2
(45) Date of Patent: Dec. 31, 2019

(54) GAS TURBINE ENGINE AIRFOIL

(71) Applicant: UNITED TECHNOLOGIES CORPORATION, Farmington, CT (US)

(72) Inventors: Edward J. Gallagher, West Hartford, CT (US); Byron R. Monzon, Cromwell, CT (US); Ling Liu, Glastonbury, CT (US); Linda S. Li, Middlefield, CT (US); Darryl Whitlow, Middletown, CT (US); Barry M. Ford, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 673 days.

(21) Appl. No.: 15/113,868

(22) PCT Filed: Aug. 22, 2014

(86) PCT No.: PCT/US2014/052325
§ 371 (c)(1),
(2) Date: Jul. 25, 2016

(87) PCT Pub. No.: WO2015/126451
PCT Pub. Date: Aug. 27, 2015

(65) Prior Publication Data
US 2016/0341212 A1    Nov. 24, 2016

Related U.S. Application Data

(60) Provisional application No. 61/941,768, filed on Feb. 19, 2014.

(51) Int. Cl.
*F04D 29/38* (2006.01)
*F01D 5/14* (2006.01)
(Continued)

(52) U.S. Cl.
CPC .............. *F04D 29/38* (2013.01); *F01D 5/141* (2013.01); *F02C 3/04* (2013.01); *F02C 7/36* (2013.01);
(Continued)

(58) Field of Classification Search
None
See application file for complete search history.

(56) References Cited

U.S. PATENT DOCUMENTS 2,714,499 A    8/1955    Warner
2,746,672 A    5/1956    Doll, Jr.
(Continued)

FOREIGN PATENT DOCUMENTS

DE    1903642       8/1970
DE    1903642 A1    8/1970
(Continued)

OTHER PUBLICATIONS

Aerodynamic Design technique for Optimizing Fan Blade Spacing, Rogalsky et all., Proceedings of the 7th Annual Conference of the Computational Fluid Dynamics Society of Canada, 1999.
(Continued)

*Primary Examiner* — Justin D Seabe
*Assistant Examiner* — Jason A Fountain
(74) *Attorney, Agent, or Firm* — Carlson, Gaskey & Olds, P.C.

(57) ABSTRACT

An airfoil for a turbine engine includes pressure and suction sides that extend in a radial direction from a 0% span position at an inner flow path location to a 100% span position at an airfoil tip. The airfoil geometry corresponds to axial leading and trailing edge curves and an axial stacking offset curve. The airfoil extends from a root and a zero axial reference point corresponds to axial center of the root. $X_{LE}$ corresponds to an axial distance from a leading edge to the
(Continued)

reference point at a given span position. $X_{TE}$ corresponds to a axial distance from a trailing edge to the reference point at a given span position. $X_d$ corresponds to an axial stacking offset at a given span position. $(X_{LE}-X_d)/(X_d-X_{TE})$ at 100% span position is about 1 and $(X_{LE}-X_d)/(X_d-X_{TE})$ at 90% span position is about 1.

10 Claims, 6 Drawing Sheets

(51) Int. Cl.
   *F04D 29/32* (2006.01)
   *F02C 3/04* (2006.01)
   *F02C 7/36* (2006.01)
   *F02K 3/06* (2006.01)

(52) U.S. Cl.
   CPC .............. *F02K 3/06* (2013.01); *F04D 29/325* (2013.01); *F05D 2220/32* (2013.01); *F05D 2220/36* (2013.01); *F05D 2240/35* (2013.01); *Y02T 50/672* (2013.01); *Y02T 50/673* (2013.01)

(56) References Cited

U.S. PATENT DOCUMENTS

| | | |
|---|---|---|
| 2,934,259 A | 4/1960 | Hausmann |
| 3,287,906 A | 11/1966 | McCormick |
| 3,747,343 A | 7/1973 | Rosen |
| 3,754,484 A | 8/1973 | Roberts |
| 3,867,062 A | 2/1975 | Troller |
| 3,892,358 A | 7/1975 | Gisslen |
| 3,905,191 A | 9/1975 | Matto |
| 4,012,172 A | 3/1977 | Schwaar et al. |
| 4,130,872 A | 12/1978 | Harloff |
| 4,284,388 A | 8/1981 | Szewalski |
| 4,431,376 A | 2/1984 | Lubenstein et al. |
| 4,682,935 A | 7/1987 | Martin |
| 4,826,400 A | 5/1989 | Gregory |
| 4,900,230 A | 2/1990 | Patel |
| 5,088,892 A | 2/1992 | Weingold et al. |
| 5,141,400 A | 8/1992 | Murphy et al. |
| 5,167,489 A | 12/1992 | Wadia et al. |
| 5,192,190 A | 3/1993 | Ferleger |
| 5,211,703 A | 5/1993 | Ferleger |
| 5,221,181 A | 6/1993 | Ferleger |
| 5,277,549 A | 1/1994 | Chen et al. |
| 5,433,674 A | 7/1995 | Sheridan et al. |
| 5,443,367 A | 8/1995 | Samit et al. |
| 5,447,411 A | 9/1995 | Curley et al. |
| 5,524,341 A | 6/1996 | Ferleger |
| 5,524,847 A | 6/1996 | Brodell et al. |
| 5,525,038 A | 6/1996 | Sharma et al. |
| 5,624,234 A | 4/1997 | Neely et al. |
| 5,642,985 A | 7/1997 | Spear et al. |
| 5,725,354 A | 3/1998 | Wadia et al. |
| 5,778,659 A | 7/1998 | Duesler et al. |
| 5,785,498 A | 7/1998 | Quinn et al. |
| 5,857,836 A | 1/1999 | Stickler et al. |
| 5,915,917 A | 6/1999 | Eveker et al. |
| 5,975,841 A | 11/1999 | Lindemuth et al. |
| 6,059,532 A | 5/2000 | Chen et al. |
| 6,071,077 A * | 6/2000 | Rowlands ............... F01D 5/141 416/223 A |
| 6,079,948 A | 6/2000 | Sasaki et al. |
| 6,195,983 B1 | 3/2001 | Wadia |
| 6,223,616 B1 | 5/2001 | Sheridan |
| 6,299,412 B1 | 10/2001 | Wood et al. |
| 6,312,219 B1 | 11/2001 | Wood et al. |
| 6,318,070 B1 | 11/2001 | Rey et al. |
| 6,328,533 B1 | 12/2001 | Decker et al. |
| 6,331,100 B1 | 12/2001 | Liu et al. |
| 6,341,942 B1 | 1/2002 | Chou et al. |
| 6,565,334 B1 | 5/2003 | Bradbury |
| 6,814,541 B2 | 11/2004 | Evans et al. |
| 6,899,526 B2 | 5/2005 | Doloresco et al. |
| 6,994,524 B2 | 2/2006 | Owen et al. |
| 7,021,042 B2 | 4/2006 | Law |
| 7,114,911 B2 | 10/2006 | Martin et al. |
| 7,204,676 B2 | 4/2007 | Dutton et al. |
| 7,374,403 B2 | 5/2008 | Decker et al. |
| 7,396,205 B2 | 7/2008 | Dube et al. |
| 7,476,086 B2 | 1/2009 | Wadia et al. |
| 7,497,664 B2 | 3/2009 | Walter et al. |
| 7,547,186 B2 | 6/2009 | Schuster et al. |
| 7,591,754 B2 | 9/2009 | Duong et al. |
| 7,785,075 B2 | 8/2010 | Botrel et al. |
| 7,806,653 B2 | 10/2010 | Burton et al. |
| 7,824,305 B2 | 11/2010 | Duong et al. |
| 7,926,260 B2 | 4/2011 | Sheridan et al. |
| 7,967,571 B2 | 6/2011 | Wood et al. |
| 7,997,872 B2 | 8/2011 | Wilson |
| 7,997,882 B2 | 8/2011 | Shulver |
| 8,087,885 B2 | 1/2012 | Suciu et al. |
| 8,147,207 B2 | 4/2012 | Orosa et al. |
| 8,167,548 B2 | 5/2012 | Greim |
| 8,167,567 B2 | 5/2012 | Kirchner et al. |
| 8,177,496 B2 | 5/2012 | Wilson et al. |
| 8,205,432 B2 | 6/2012 | Sheridan |
| 8,246,292 B1 | 8/2012 | Morin et al. |
| RE43,710 E | 10/2012 | Spear et al. |
| 8,382,438 B2 | 2/2013 | Guemmer |
| 8,393,870 B2 | 3/2013 | Nash et al. |
| 8,464,426 B2 | 6/2013 | Kirchner et al. |
| 2002/0141863 A1 | 10/2002 | Liu |
| 2003/0086788 A1 | 5/2003 | Chandraker |
| 2003/0163983 A1 | 9/2003 | Seda et al. |
| 2004/0091353 A1 | 5/2004 | Shahpar et al. |
| 2005/0031454 A1 | 2/2005 | Doloresco et al. |
| 2005/0169761 A1 | 8/2005 | Dube et al. |
| 2005/0254956 A1 | 11/2005 | Dutton et al. |
| 2006/0210395 A1 | 9/2006 | Schuster et al. |
| 2006/0222488 A1 | 10/2006 | Fessou |
| 2006/0228206 A1 | 10/2006 | Decker et al. |
| 2007/0041841 A1 | 2/2007 | Walter et al. |
| 2007/0160478 A1 | 7/2007 | Jarrah et al. |
| 2007/0201983 A1 | 8/2007 | Arinci et al. |
| 2007/0243068 A1 | 10/2007 | Wadia et al. |
| 2008/0101959 A1 | 5/2008 | McRae et al. |
| 2008/0107538 A1 | 5/2008 | Bois et al. |
| 2008/0120839 A1 | 5/2008 | Schilling |
| 2008/0131271 A1 | 6/2008 | Wood et al. |
| 2008/0148564 A1 | 6/2008 | Burton et al. |
| 2008/0226454 A1 | 9/2008 | Decker et al. |
| 2009/0226322 A1 | 9/2009 | Clemen |
| 2009/0257866 A1 | 10/2009 | Greim |
| 2009/0274554 A1 | 11/2009 | Guemmer |
| 2009/0297355 A1 | 12/2009 | Herr et al. |
| 2009/0304518 A1 | 12/2009 | Kodama et al. |
| 2009/0317227 A1 | 12/2009 | Grover et al. |
| 2010/0054946 A1 | 3/2010 | Orosa et al. |
| 2010/0148396 A1 | 6/2010 | Xie et al. |
| 2010/0215503 A1 | 8/2010 | Myoren et al. |
| 2010/0232970 A1 | 9/2010 | Murooka et al. |
| 2010/0254797 A1 | 10/2010 | Grover et al. |
| 2010/0260609 A1 | 10/2010 | Wood et al. |
| 2010/0331139 A1 | 12/2010 | McCune |
| 2011/0081252 A1 | 4/2011 | Li |
| 2011/0116917 A1 | 5/2011 | Wang et al. |
| 2011/0135482 A1 | 6/2011 | Nash et al. |
| 2011/0150660 A1 | 6/2011 | Micheli |
| 2011/0206527 A1 | 8/2011 | Harvey et al. |
| 2011/0225979 A1 | 9/2011 | Hoeger et al. |
| 2011/0268578 A1 | 11/2011 | Praisner et al. |
| 2011/0286850 A1 | 11/2011 | Micheli et al. |
| 2011/0286856 A1 | 11/2011 | Micheli |
| 2012/0057982 A1 | 3/2012 | O'Hearn et al. |
| 2012/0195767 A1 | 8/2012 | Gervais et al. |
| 2012/0237344 A1 | 9/2012 | Wood et al. |
| 2012/0243975 A1 | 9/2012 | Breeze-Stringfellow et al. |
| 2012/0243983 A1 | 9/2012 | Breeze-Stringfellow et al. |
| 2012/0244005 A1 | 9/2012 | Breeze-Stringfellow et al. |

(56) References Cited

U.S. PATENT DOCUMENTS

| | | | |
|---|---|---|---|
| 2013/0008170 | A1 | 1/2013 | Gallagher et al. |
| 2013/0022473 | A1 | 1/2013 | Tran |
| 2013/0089415 | A1 | 4/2013 | Brown |
| 2013/0141935 | A1 | 6/2013 | Huang |
| 2013/0149108 | A1 | 6/2013 | Webster |
| 2013/0164488 | A1 | 6/2013 | Wood et al. |
| 2013/0189117 | A1 | 7/2013 | Baltas et al. |
| 2013/0192199 | A1 | 8/2013 | Merry et al. |
| 2013/0192261 | A1 | 8/2013 | Mayer et al. |
| 2013/0192266 | A1 | 8/2013 | Houston |
| 2013/0202403 | A1 | 8/2013 | Morin et al. |
| 2013/0219859 | A1 | 8/2013 | Suciu |
| 2013/0219922 | A1 | 8/2013 | Gilson et al. |
| 2013/0224040 | A1 | 8/2013 | Straccia |
| 2013/0259668 | A1 | 10/2013 | Myoren et al. |
| 2013/0266451 | A1 | 10/2013 | Pesteil et al. |
| 2013/0315739 | A1 | 11/2013 | Cellier |
| 2013/0340406 | A1 | 12/2013 | Gallagher et al. |
| 2014/0030060 | A1 | 1/2014 | Magowan |
| 2014/0248155 | A1 | 9/2014 | Merville et al. |
| 2014/0341749 | A1 | 11/2014 | Perrot et al. |
| 2015/0017012 | A1 | 1/2015 | Pouzadoux et al. |
| 2015/0118059 | A1 | 4/2015 | Perrot |
| 2015/0354367 | A1 | 12/2015 | Gallagher et al. |
| 2016/0195104 | A1 | 7/2016 | Cellier |

FOREIGN PATENT DOCUMENTS

| | | | |
|---|---|---|---|
| DE | 102008055824 | | 5/2009 |
| EP | 0082100 | | 6/1983 |
| EP | 0251978 | A | 1/1988 |
| EP | 0661413 | A1 | 7/1995 |
| EP | 0745755 | A2 | 12/1996 |
| EP | 0774567 | | 5/1997 |
| EP | 1074700 | A2 | 2/2001 |
| EP | 1098092 | A2 | 5/2001 |
| EP | 1106835 | A2 | 6/2001 |
| EP | 1106836 | | 6/2001 |
| EP | 1106836 | A2 | 6/2001 |
| EP | 1111188 | A2 | 6/2001 |
| EP | 1505302 | | 2/2005 |
| EP | 1505302 | A1 | 2/2005 |
| EP | 1508669 | A1 | 2/2005 |
| EP | 1524405 | A2 | 4/2005 |
| EP | 1582695 | | 10/2005 |
| EP | 1939399 | A2 | 7/2008 |
| EP | 0801230 | | 5/2009 |
| EP | 2075408 | A2 | 7/2009 |
| EP | 2133573 | A1 | 12/2009 |
| EP | 2226468 | | 9/2010 |
| EP | 2226468 | A2 | 9/2010 |
| EP | 1930598 | | 8/2012 |
| EP | 2535527 | | 12/2012 |
| EP | 2543818 | | 1/2013 |
| EP | 2543818 | A2 | 1/2013 |
| EP | 2631491 | A1 | 8/2013 |
| EP | 2995771 | | 3/2016 |
| GB | 1516041 | | 6/1978 |
| GB | 2041090 | | 9/1980 |
| GB | 2170868 | A | 8/1986 |
| GB | 2431697 | | 5/2007 |
| GB | 2431697 | A * | 5/2007 ............ F01D 5/141 |
| JP | H08165999 | | 6/1996 |
| JP | 2014015858 | | 1/2014 |
| WO | 2007001389 | | 1/2007 |
| WO | 2007038674 | | 4/2007 |
| WO | 2008109036 | A1 | 9/2008 |
| WO | 2009103528 | | 8/2009 |
| WO | 2014066503 | A1 | 5/2014 |
| WO | 2015126449 | A1 | 8/2015 |
| WO | 2015126774 | | 8/2015 |

OTHER PUBLICATIONS

Turbine Design and Application. vol. 2. NASA, 1973.
Analytical Parametric Investigation of Low Pressure Ration Fan, NASA, 1973 Metzger et al.
Oyama et al., Multiobjective Optimization of a Multi-Stage Compressor Using Evolutionary Algorithm, NASA, 2002, AIAA 2002-3535 pp. 1-11.
The International Search Report and Written Opinion for PCT Application No. PCT/US2015/016083, dated Jul. 21, 2015.
Extended EP Search report for EP Application No. 15793193.2 dated May 12, 2017.
Extended European Search Report for European Application No. 15792720.3 dated Jan. 31, 2018.
European Search Report for European Patent Application No. 14883170.4 dated Apr. 19, 2018.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
The International Search Report and Written Opinion for PCT Application No. PCT/US2015/016187, dated May 20, 2015.
The International Search Report and Written Opinion for PCT Application No. PCT/US2015/016011, dated May 21, 2015.
The International Search Report and Written Opinion for PCT Application No. PCT/US2015/016078, dated May 29, 2015.
The International Search Report and Written Opinion for PCT Application No. PCT/US2015/016154, dated May 22, 2015.
The International Search Report and Written Opinion for PCT Application No. PCT/US2015/016086, dated May 26, 2015.
The International Search Report and Written Opinion for PCT Application No. PCT/US2015/016554, dated May 26, 2015.
The International Search Report and Written Opinion for PCT Application No. PCT/US2015/015554, dated May 21, 2015.
The International Search Report and Written Opinion for PCT Application No. PCT/US2014/052325, dated May 29, 2015.
The International Search Report and Written Opinion for PCT Application No. PCT/US2015/016378, dated May 29, 2015.
The International Search Report and Written Opinion for PCT Application No. PCT/US2014/052293, dated May 29, 2015.
The International Search Report and Written Opinion for PCT Application No. PCT/US2014/052516, dated Jun. 10, 2015.
Intentional Search Report and Written Opinion for PCT Application PCT/US2014/052447 dated Dec. 8, 2014.
Intentional Search Report and Written Opinion for PCT Application PCT/US2014/052441 dated Dec. 12, 2014.
Intentional Search Report and Written Opinion for PCT Application PCT/US2014/052282 dated Dec. 5, 2014.
Intentional Search Report and Written Opinion for PCT Application PCT/US2014/052474 dated Dec. 5, 2014.
Intentional Search Report and Written Opinion for PCT Application PCT/US2014/052434 dated Nov. 27, 2014.
Intentional Search Report and Written Opinion for PCT Application PCT/US2014/052468 dated Dec. 12, 2014.
Intentional Search Report and Written Opinion for PCT Application PCT/US2015/016083 dated Jul. 21, 2015.
Intentional Search Report and Written Opinion for PCT Application PCT/US2014/052440 dated Nov. 27, 2014.

(56) References Cited

OTHER PUBLICATIONS

Intentional Search Report and Written Opinion for PCT Application PCT/US2014/052437 dated Dec. 26, 2014.
Intentional Search Report and Written Opinion for PCT Application PCT/US2014/052238 dated Dec. 11, 2014.
Intentional Search Report and Written Opinion for PCT Application PCT/US2014/052080 dated Aug. 21, 2014.
Intentional Search Report and Written Opinion for PCT Application PCT/US2014/052096 dated Nov. 28, 2014.
International Preliminary Report on Patentability for PCT Application No. PCT/US2014/052282, dated Sep. 1, 2016.
International Preliminary Report on Patentability for PCT Application No. PCT/US2015/016554, dated Sep. 1, 2016.
International Preliminary Report on Patentability for PCT Application No. PCT/US2014/052434, dated Sep. 1, 2016.
International Preliminary Report on Patentability for PCT Application No. PCT/US2014/052516, dated Sep. 1, 2016.
International Preliminary Report on Patentability for PCT Application No. PCT/US2014/052447, dated Sep. 1, 2016.
International Preliminary Report on Patentability for PCT Application No. PCT/US2015/015579, dated Sep. 1, 2016.
International Preliminary Report on Patentability for PCT Application No. PCT/US2015/015586, dated Sep. 1, 2016.
International Preliminary Report on Patentability for PCT Application No. PCT/US2014/052080, dated Sep. 1, 2016.
International Preliminary Report on Patentability for PCT Application No. PCT/US2015/016135, dated Sep. 1, 2016.
International Preliminary Report on Patentability for PCT Application No. PCT/US2015/016032 dated Sep. 1, 2016.
International Preliminary Report on Patentability for PCT Application No. PCT/US2015/015561 dated Sep. 1, 2016.
Extended European Search Report for European Application No. 14882896.5 dated Oct. 19, 2017.
Extended European Search Report for European Application No. 14883503.6 dated Nov. 6, 2017.
Extended European Search Report for European Application No. 15752013.1 dated Dec. 5, 2017.
Extended European Search Report for European Application No. 15751617.0 dated Dec. 5, 2017.
Extended European Search Report for European Application No. 15793127.0 dated Dec. 1, 2017.
Extended European Search Report for European Application No. 15792720.3 dated Oct. 17, 2017.
International Preliminary Report on Patentability for PCT Application No. PCT/US2014/052325, dated Sep. 1, 2016.
Smith, L., Yeh,H.,(1963).Sweep and Dihedral Effects in Axial-Flow Turbomachinery;Journal of Basic Engineering; Sep. 1963.pp. 401-416.
Engine Specifications. Engine Alliance GP7200—The Engine for the A380. Retrieved Feb. 19, 2015 from http://www.enginealliance.com/engine_specifications.html.
International Search Report and Written Opinion for PCT Application No. PCT/US2015/016018, dated Nov. 24, 2015.
International Search Report and Written Opinion for PCT Application No. PCT/US2015016091, dated Nov. 24, 2015.
International Search Report and Written Opinion for PCT Application No. PCT/US2015/016032, dated Nov. 24, 2015.
International Search Report and Written Opinion for PCT Application No. PCT/US2015/016135, dated Nov. 24, 2015.
International Search Report and Written Opinion for PCT Application No. PCT/US2015/016584, dated Nov. 24, 2015.
International Search Report and Written Opinion for PCT Application No. PCT/US2015/015561, dated Nov. 24, 2015.
International Search Report and Written Opinion for PCT Application No. PCT/US2015/015575, dated Nov. 24, 2015.
International Search Report and Written Opinion for PCT Application No. PCT/US2015/015579, dated Nov. 24, 2015.
International Search Report and Written Opinion for PCT Application No. PCT/US2015/015586, dated Nov. 24, 2015.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.

(56) References Cited

OTHER PUBLICATIONS

Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
EP Search Report dated Jan. 24, 2017 for European Application No. 14883154.8.
EP Search Report dated Jan. 23, 2017 for European Application No. 148831175.
EP Search Report dated Jan. 24, 2017 for European Application No. 15752432.3.
EP Search Report dated Jan. 26, 2017 for European Application No. 15793425.8.
Partial EP Search Report dated Feb. 8, 2017 for European Application No. 15793193.2.
EP Search Report dated Feb. 9, 2017 for European Application No. 15752887.8.
EP Search Report dated Feb. 9, 2017 for European Application No. 14883515.0.
EP Search Report dated Jan. 30, 2017 for European Application No. 15752124.6.
EP Search Report dated Jan. 30, 2017 for European Application No. 15751498.5.
EP Search Report dated Feb. 3, 2017 for European Application No. 15751454.8.
EP Search Report dated Feb. 3, 2017 for European Application No. 15793323.5.
EP Search Report dated Feb. 3, 2017 for European Application No. 15796827.2.
EP Search Report dated Feb. 13, 2017 for European Application No. 15792194.1.
EP Search Report dated Feb. 13, 2017 for European Application No. 15751738.4.
EP Search Report dated Feb. 13, 2017 for European Application No. 15752593.2.
EP Search Report dated Feb. 13, 2017 for European Application No. 14883036.7.
EP Search Report dated Feb. 22, 2017 for European Application No. 15793112.2.
EP Search Report dated Feb. 20, 2017 for European Application No. 15793268.2.

\* cited by examiner

GAS TURBINE ENGINE AIRFOIL

CROSS-REFERENCE TO RELATED APPLICATIONS

This application claims priority to U.S. Provisional Application No. 61/941,768, which was filed on Feb. 19, 2014 and is incorporated herein by reference.

BACKGROUND

This disclosure relates generally to an airfoil for gas turbine engines, and more particularly to axial projection relative to span.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The propulsive efficiency of a gas turbine engine depends on many different factors, such as the design of the engine and the resulting performance debits on the fan that propels the engine. As an example, the fan may rotate at a high rate of speed such that air passes over the fan airfoils at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

In one exemplary embodiment, an airfoil for a turbine engine includes pressure and suction sides that extend in a radial direction from a 0% span position at an inner flow path location to a 100% span position at an airfoil tip. The airfoil geometry corresponds to axial leading and trailing edge curves and an axial stacking offset curve. The airfoil extends from a root and a zero axial reference point corresponds to axial center of the root. $X_{LE}$ corresponds to an axial distance from a leading edge to the reference point at a given span position. $X_{TE}$ corresponds to a axial distance from a trailing edge to the reference point at a given span position. $X_d$ corresponds to an axial stacking offset at a given span position. $(X_{LE}-X_d)/(X_d-X_{TE})$ at 100% span position is about 1 and $(X_{LE}-X_d)/(X_d-X_{TE})$ at 90% span position is about 1.

In a further embodiment of the above, $(X_{LE}-X_d)/(X_d-X_{TE})$ at 60% span position is about 1.2 and $(X_{LE}-X_d)/(X_d-X_{TE})$ at 50% span position about 0.92.

In a further embodiment of any of the above, $(X_{LE}-X_d)/(X_d-X_{TE})$ at 40% span position is about 0.92 and $(X_{LE}-X_d)/(X_d-X_{TE})$ at 20% span position is about 0.92.

In a further embodiment of any of the above, $(X_{LE}-X_d)/(X_d-X_{TE})$ at 60% span position is about 0.92 and $(X_{LE}-X_d)/(X_d-X_{TE})$ at 50% span position is about 0.92.

In a further embodiment of any of the above, $(X_{LE}-X_d)/(X_d-X_{TE})$ at 60% span position is about 0.89 and $(X_{LE}-X_d)/(X_d-X_{TE})$ at 50% span position is about 1.

In a further embodiment of any of the above, $(X_{LE}-X_d)/(X_d-X_{TE})$ at 40% span position about 1 and $(X_{LE}-X_d)/(X_d-X_{TE})$ at 20% span position is about 1.

In a further embodiment of any of the above, the airfoil is a fan blade for a gas turbine engine.

In a further embodiment of any of the above, $(X_{LE}-X_d)/(X_d-X_{TE})$ has a tolerance of +/−0.05.

In another exemplary embodiment, a gas turbine engine includes a combustor section arranged between a compressor section and a turbine section, a fan section that has an array of twenty-six or fewer fan blades that have a low fan pressure ratio of less than 1.55 and a geared architecture coupling the fan section to the turbine section or the compressor section. The fan blades include an airfoil that has pressure and suction sides. The airfoil extends in a radial direction from a 0% span position at an inner flow path location to a 100% span position at an airfoil tip. The airfoil geometry corresponds to axial leading and trailing edge curves and an axial stacking offset curve. The airfoil extends from a root and a zero axial reference point corresponds to an axial center of the root. $X_{LE}$ corresponds to an axial distance from a leading edge to the reference point at a given span position. $X_{TE}$ corresponds to an axial distance from a trailing edge to the reference point at a given span position. $X_d$ corresponds to an axial stacking offset at a given span position. $(X_{LE}-X_d)/(X_d-X_{TE})$ at 100% span position is about 1 and $(X_{LE}-X_d)/(X_d-X_{TE})$ at 90% span position is about 1.

In a further embodiment of any of the above, $(X_{LE}-X_d)/(X_d-X_{TE})$ has a tolerance of +/−0.05.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
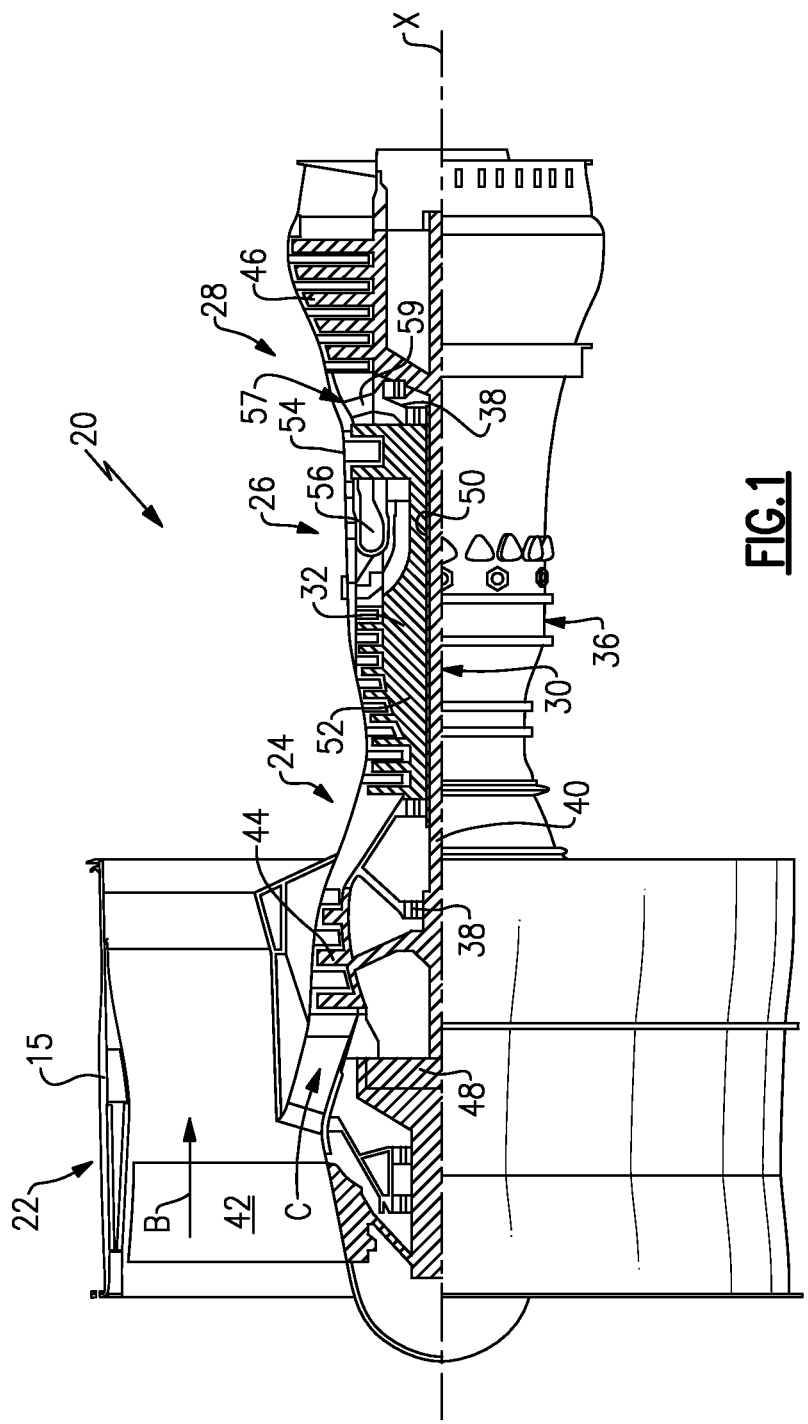
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second. The "low corrected fan tip speed" as disclosed herein according to another non-limiting embodiment is less than about 1200 ft/second.

Figure 2A:
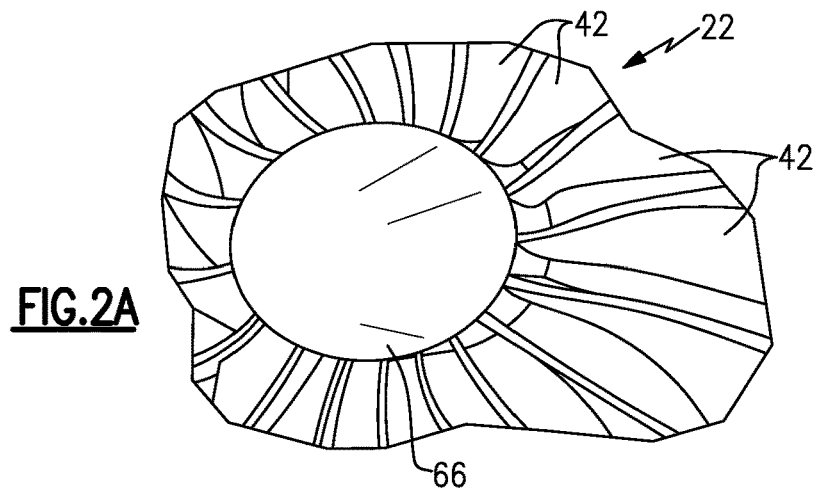
FIG. 2A is a perspective view of a portion of a fan section.
Figure 2B:
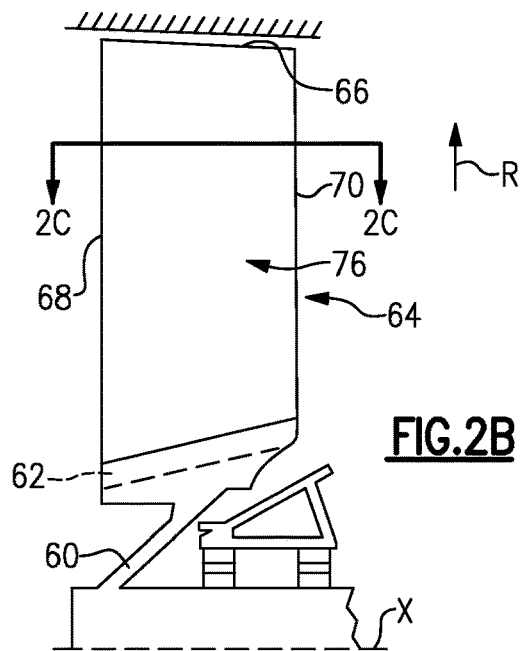
FIG. 2B is a schematic cross-sectional view of the fan section.
Figure 2C:
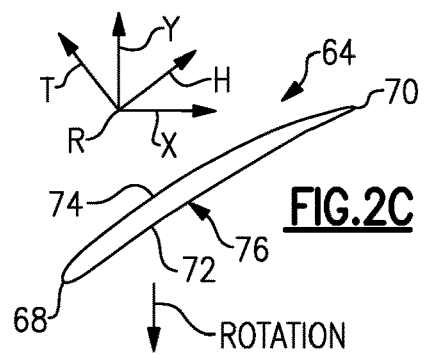
FIG. 2C is a cross-sectional view a fan blade taken along line 2C-2C in FIG. 2B.

Referring to FIG. 2A-2C, the fan blade 42 is supported by a fan hub 60 that is rotatable about the axis X. Each fan blade 42 includes an airfoil 64 extending in a radial span direction R from a root 62 to a tip 66. A 0% span position corresponds to a section of the airfoil 64 at the inner flow path (e.g., a platform), and a 100% span position corresponds to a section of the airfoil 64 at the tip 66.

The root 62 is received in a correspondingly shaped slot in the fan hub 60. The airfoil 64 extends radially outward of the platform, which provides the inner flow path. The platform may be integral with the fan blade or separately secured to the fan hub, for example. A spinner 66 is supported relative to the fan hub 60 to provide an aerodynamic inner flow path into the fan section 22.

The airfoil 64 has an exterior surface 76 providing a contour that extends from a leading edge 68 aftward in a chord-wise direction H to a trailing edge 70, as shown in FIG. 2C. Pressure and suction sides 72, 74 join one another at the leading and trailing edges 68, 70 and are spaced apart from one another in an airfoil thickness direction T. An array of the fan blades 42 are positioned about the axis X in a circumferential or tangential direction Y. Any suitable number of fan blades may be used in a given application.

The exterior surface 76 of the airfoil 64 generates lift based upon its geometry and directs flow along the core flow path C. The fan blade 42 may be constructed from a composite material, or an aluminum alloy or titanium alloy, or a combination of one or more of these. Abrasion-resistant coatings or other protective coatings may be applied to the fan blade 42.

Figure 3A:
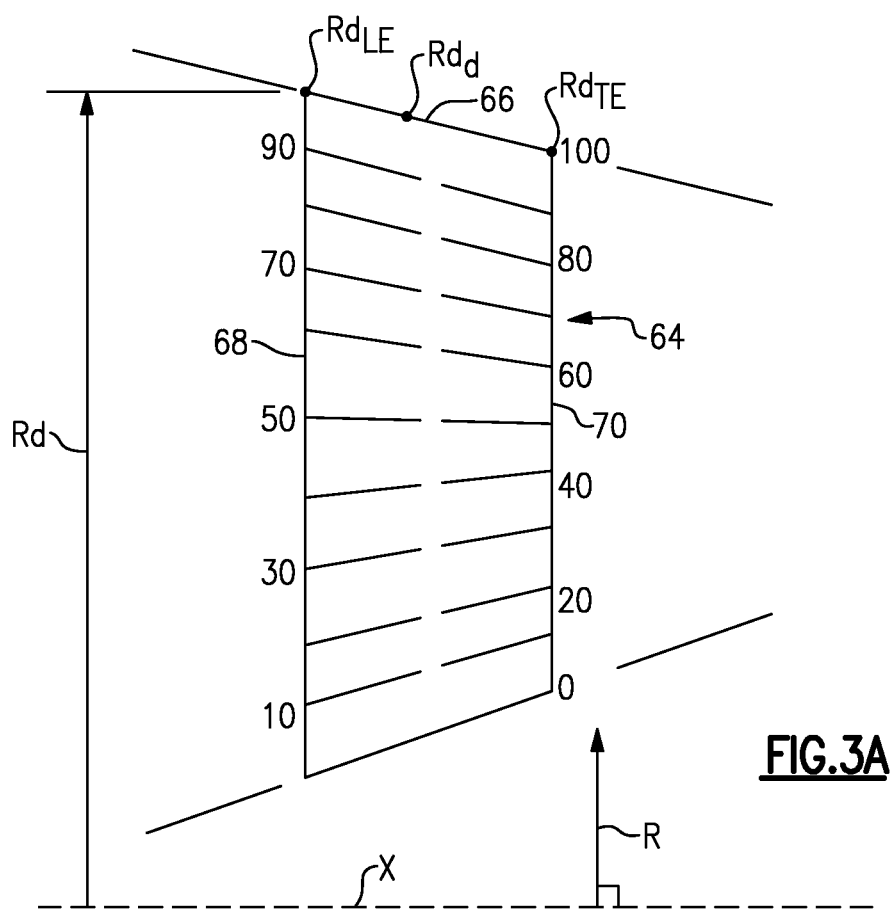
FIG. 3A is a schematic view of fan blade span positions.

One characteristic of fan blade performance relates to the fan blade's axial stacking offset and leading and trailing edge positions (X direction) relative to a particular span position (R direction). Referring to FIG. 3A, span positions a schematically illustrated from 0% to 100% in 10% increments. Each section at a given span position is provided by a conical cut that corresponds to the shape of the core flow path, as shown by the large dashed lines. In the case of a fan blade with an integral platform, the 0% span position corresponds to the radially innermost location where the airfoil meets the fillet joining the airfoil to the platform. In the case of a fan blade without an integral platform, the 0% span position corresponds to the radially innermost location where the discrete platform meets the exterior surface of the airfoil. In addition to varying with span, axial projection varies between a hot, running condition and a cold, static ("on the bench") condition.

Figure 3B:
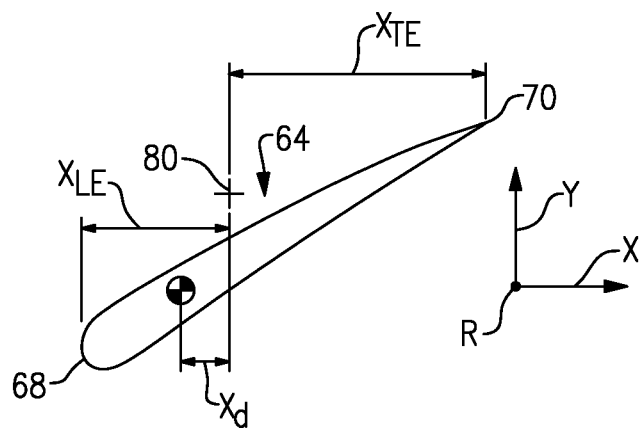
FIG. 3B is a schematic view of a cross-section of a fan blade section at a particular span position and its axial twist and chord parameters.

The $X_{CG}$ corresponds to the location of the center of gravity for a particular section at a given span location relative to a reference point 80 in the X direction, as shown in FIG. 3B. The center of gravity assumes a homogenous material. The reference point 80 is the axial center of the root, and $X_d$ corresponds to the axial distance from the reference point 80 to the center of gravity.

A positive X value corresponds to the aftward direction along the engine's axis of rotation. A negative X value corresponds to the forward direction along the engine's axis of rotation.

The axial leading edge location is arranged at the leading edge 68 for a particular section at a given span location relative to the reference point 80 in the X direction, as shown in FIG. 3B. $X_{LE}$ corresponds to the axial distance from the reference point 80 to the axial leading edge location at a given span location.

The axial trailing edge location is arranged at the trailing edge 70 for a particular section at a given span location relative to the reference point 80 in the X direction. $X_{TE}$ corresponds to the axial distance from the reference point 80 to the axial trailing edge location at a given span location.

The axial changes in fan blade axial projection at various span positions can be expressed using the differences $X_{LE}-X_d$ and $X_d-X_{TE}$, which are tangential distances between the locations. These differences can be used to provide non-dimensional ratios indicative of desired airfoil characteristics.

In one prior art airfoil, $(X_{LE}-X_d)/(X_d-X_{TE})$ at 100% span position is about 0.89 and $(X_{LE}-X_d)/(X_d-X_{TE})$ at 90% span position is about 0.91; $(X_{LE}-X_d)/(X_d-X_{TE})$ at 60% span position is about 1.07 and $(X_{LE}-X_d)/(X_d-X_{TE})$ at 50% span position about 0.88; and $(X_{LE}-X_d)/(X_d-X_{TE})$ at 40% span position is about 0.94 and $(X_{LE}-X_d)/(X_d-X_{TE})$ at 20% span position is about 0.88.

Figure 4A:
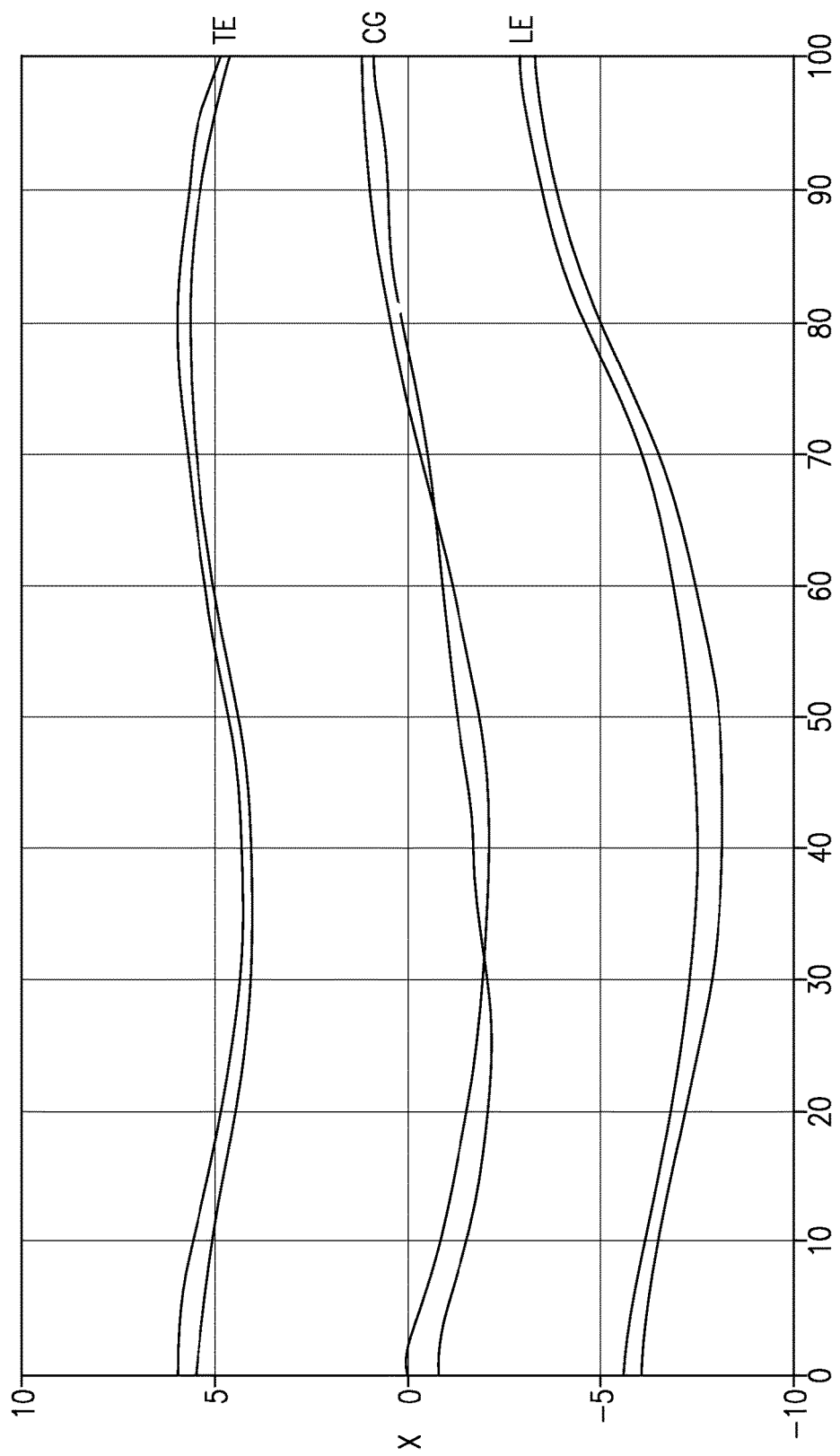
FIG. 4A illustrates a relationship between axial leading edge position, axial stacking offset position and axial trailing edge position relative to span position for a set of first example airfoils.
Figure 4B:
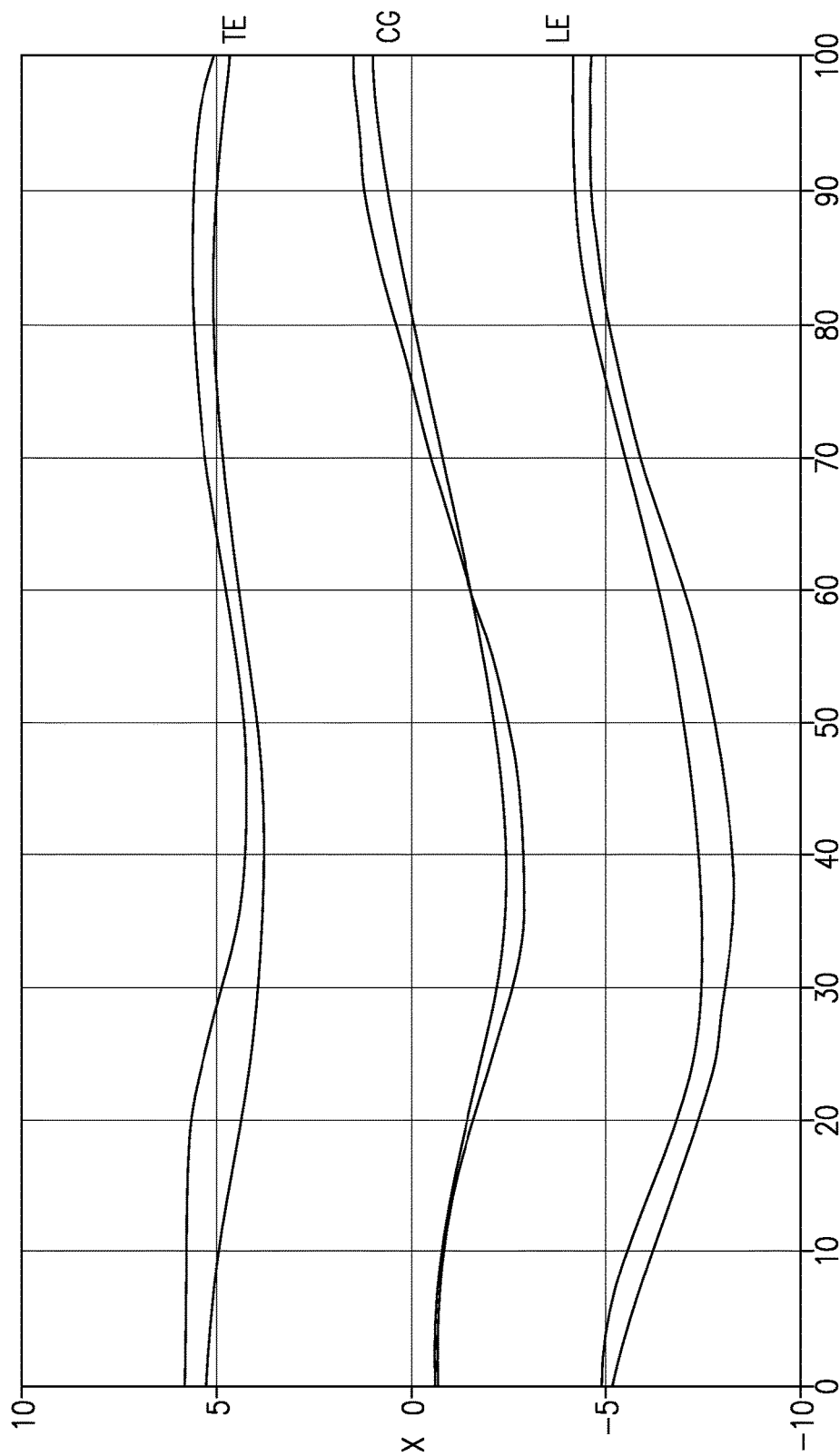
FIG. 4B illustrates a relationship between axial leading edge position, axial stacking offset position and axial trailing edge position relative to span position for a set of second example airfoils.
Figure 4C:
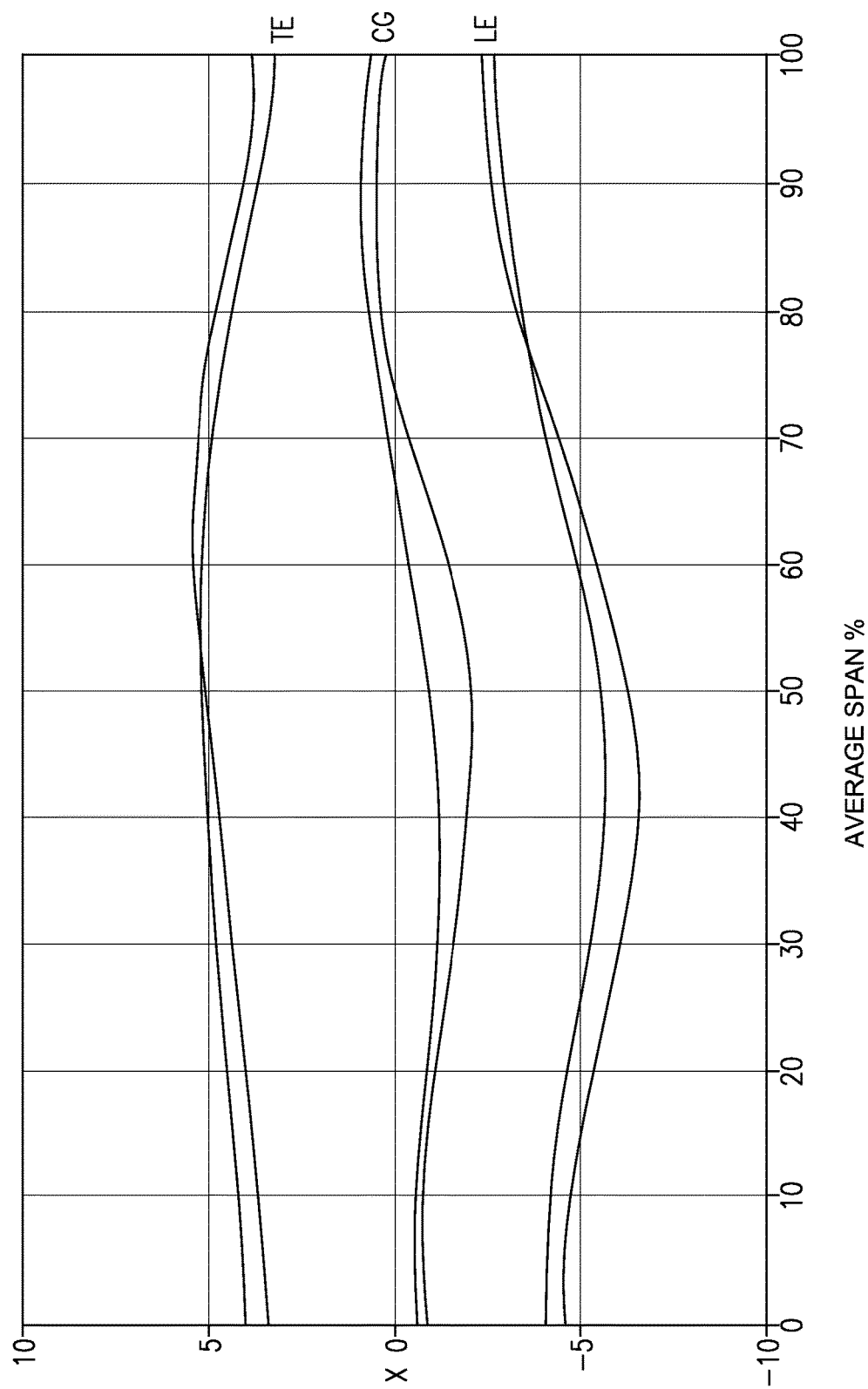
FIG. 4C illustrates a relationship between axial leading edge position, axial stacking offset position and axial trailing edge position relative to span position for a set of third example airfoils.

Example relationships between the axial projection (X) relative to the span position (AVERAGE SPAN %) are shown in FIGS. 4A-4C for several example fan blades, each represented by a curve. Only one curve in each graph is discussed for simplicity. The airfoil geometry corresponds to axial leading and trailing edge curves and an axial stacking offset curve, and a greatest differential between the axial leading edge position and the axial trailing edge position along the curves is in the range of 30-50% span position. "About" used in relation to the $(X_{LE}-X_d)/(X_d-X_{TE})$ ratios means +/−0.10 in one example, and +/−0.05 in another example.

Referring to FIG. 4A, $(X_{LE}-X_d)/(X_d-X_{TE})$ at 100% span position is about 1 and $(X_{LE}-X_d)/(X_d-X_{TE})$ at 90% span position is about 1; $(X_{LE}-X_d)/(X_d-X_{TE})$ at 60% span position is about 1.2 and $(X_{LE}-X_d)/(X_d-X_{TE})$ at 50% span position about 0.92; and $(X_{LE}-X_d)/(X_d-X_{TE})$ at 40% span position is about 0.92 and $(X_{LE}-X_d)/(X_d-X_{TE})$ at 20% span position is about 0.92.

Referring to FIG. 4B, $(X_{LE}-X_d)/(X_d-X_{TE})$ at 100% span position is about 1 and $(X_{LE}-X_d)/(X_d-X_{TE})$ at 90% span position is about 1; $(X_{LE}-X_d)/(X_d-X_{TE})$ at 60% span position is about 0.92 and $(X_{LE}-X_d)/(X_d-X_{TE})$ at 50% span position is about 0.92; and $(X_{LE}-X_d)/(X_d-X_{TE})$ at 40% span position is about 0.92 and $(X_{LE}-X_d)/(X_d-X_{TE})$ at 20% span position is about 0.92.

Referring to FIG. 4C, $(X_{LE}-X_d)/(X_d-X_{TE})$ at 100% span position is about 1 and $(X_{LE}-X_d)/(X_d-X_{TE})$ at 90% span position is about 1; $(X_{LE}-X_d)/(X_d-X_{TE})$ at 60% span position is about 0.89 and $(X_{LE}-X_d)/(X_d-X_{TE})$ at 50% span position is about 1; and $(X_{LE}-X_d)/(X_d-X_{TE})$ at 40% span position about 1 and $(X_{LE}-X_d)/(X_d-X_{TE})$ at 20% span position is about 1.

The axial leading and trailing edge positions and axial stacking offsets in a hot, running condition along the span of the airfoils 64 relate to the contour of the airfoil and provide necessary fan operation in cruise at the lower, preferential speeds enabled by the geared architecture 48 in order to enhance aerodynamic functionality and thermal efficiency. As used herein, the hot, running condition is the condition during cruise of the gas turbine engine 20. For example, the axial leading and trailing edge positions and axial stacking offsets in the hot, running condition can be determined in a known manner using numerical analysis, such as finite element analysis It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a turbine engine comprising:
   pressure and suction sides extending in a radial direction from a 0% span position at an inner flow path location to a 100% span position at an airfoil tip, wherein the airfoil geometry corresponds to axial leading and trailing edge curves and an axial stacking offset curve, wherein the airfoil extends from a root, and a zero axial reference point corresponds to axial center of the root, $X_{LE}$ corresponds to a axial distance from a leading edge to the reference point at a given span position, $X_{TE}$ corresponds to a axial distance from a trailing edge to the reference point at a given span position, $X_d$ corresponds to an axial stacking offset at a given span position, wherein $(X_{LE}-X_d)/(X_d-X_{TE})$ at 100% span position is 1+/−0.10 and $(X_{LE}-X_d)/(X_d-X_{TE})$ at 90% span position is 1+/−0.10.

2. The airfoil according to claim 1, wherein $(X_{LE}-X_d)/(X_d-X_{TE})$ at 60% span position is 1.2+/−0.10 and $(X_{LE}-X_d)/(X_d-X_{TE})$ at 50% span position is 0.92+/−0.10.

3. The airfoil according to claim 1, wherein $(X_{LE}-X_d)/(X_d-X_{TE})$ at 40% span position is 0.92+/−0.10 and $(X_{LE}-X_d)/(X_d-X_{TE})$ at 20% span position is 0.92+/−0.10.

4. The airfoil according to claim 1, wherein $(X_{LE}-X_d)/(X_d-X_{TE})$ at 60% span position is 0.92+/−0.10 and $(X_{LE}-X_d)/(X_d-X_{TE})$ at 50% span position is 0.92+/−0.10.

5. The airfoil according to claim 1, wherein $(X_{LE}-X_d)/(X_d-X_{TE})$ at 60% span position is 0.89+/−0.10 and $(X_{LE}-X_d)/(X_d-X_{TE})$ at 50% span position is 1+/−0.10.

6. The airfoil according to claim 1, wherein $(X_{LE}-X_d)/(X_d-X_{TE})$ at 40% span position is 1+/−0.10 and $(X_{LE}-X_d)/(X_d-X_{TE})$ at 20% span position is 1+/−0.10.

7. The airfoil according to claim 1, wherein the airfoil is a fan blade for a gas turbine engine.

8. The airfoil according to claim 1, wherein $(X_{LE}-X_d)/(X_d-X_{TE})$ has a tolerance of +/−0.05.

9. A gas turbine engine comprising:
   a combustor section arranged between a compressor section and a turbine section;
   a fan section having an array of twenty-six or fewer fan blades, wherein the fan section has a low fan pressure ratio of less than 1.55;
   a geared architecture coupling the fan section to the turbine section or the compressor section; and
   wherein the fan blades include an airfoil having pressure and suction sides, the airfoil extends in a radial direction from a 0% span position at an inner flow path location to a 100% span position at an airfoil tip, wherein the airfoil geometry corresponds to axial leading and trailing edge curves and an axial stacking offset curve, wherein the airfoil extends from a root, and a zero axial reference point corresponds to axial center of the root, $X_{LE}$ corresponds to an axial distance from a leading edge to the reference point at a given span position, $X_{TE}$ corresponds to an axial distance from a trailing edge to the reference point at a given span position, $X_d$ corresponds to an axial stacking offset at a given span position, wherein $(X_{LE}-X_d)/(X_d-X_{TE})$ at 100% span position is 1+/−0.10 and $(X_{LE} X_d)/(X_d-X_{TE})$ at 90% span position is 1+/−0.10.

10. The gas turbine engine according to claim 9, wherein $(X_{LE}-X_d)/(X_d-X_{TE})$ has a tolerance of +/−0.05.

* * * * *